Feb. 24, 1942.   R. E. ROUSSEAU ET AL   2,274,277
WIPER BLADE
Filed Nov. 9, 1940
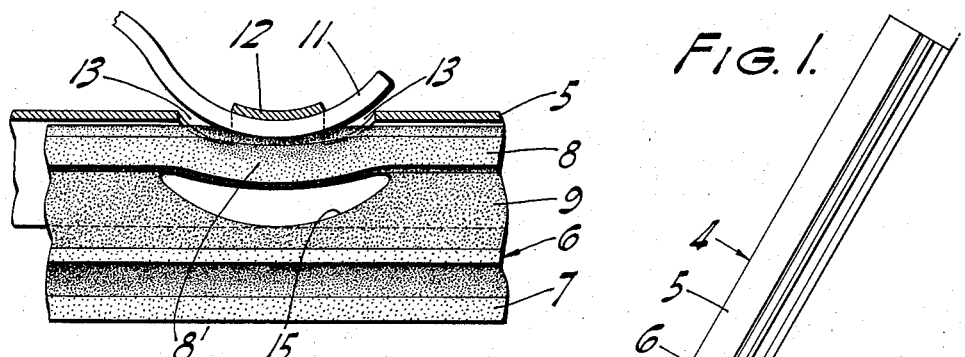
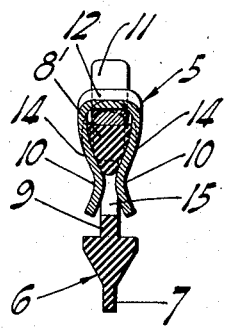
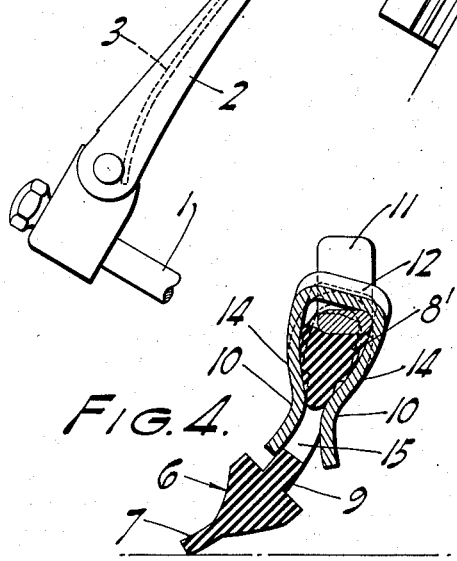
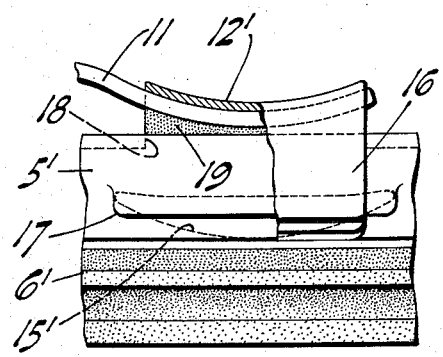
INVENTORS
RAYMON E. ROUSSEAU
AND H. WALTER CLUM
BY
Bean, Brooks, Buckley & Bean
ATTORNEYS Patented Feb. 24, 1942

2,274,277

UNITED STATES PATENT OFFICE 2,274,277

WIPER BLADE

Raymon E. Rousseau and Henry Walter Clum, Buffalo, N. Y., assignors to Trico Products Corporation, Buffalo, N. Y.

Application November 9, 1940, Serial No. 365,080

9 Claims. (Cl. 15—250)

This invention relates to a windshield cleaner and more particularly to the wiper or wiping blade and the mode of connection to its actuating arm.

The wiping blade which is now in general use in motor vehicles is provided with a channeled backing over which is secured a clip or device to adapt the blade for attachment to its actuating arm. In certain constructions it has been proposed to incorporate a light spring, auxiliary to the main spring pressure of the actuating arm, for normalizing or restoring the wiping blade to an upright position on the windshield glass. This construction is somewhat involved and fails to accomplish satisfactorily the intended purpose.

The object of the present invention is to provide a simplified wiper construction which is economically produced and practical in its operation. Further, the invention has for its object to utilize the resiliency of the rubber wiping body of the blade to exert the normalizing tendency on the latter so that the wiper, when in a parked or rested position, will readily assume an erect disposition.

In the drawing:

Fig. 1 is a fragmentary side elevation of the windshield cleaner showing the improved wiper in its operative position;

Fig. 2 is a fragmentary longitudinal section through the wiper depicting more particularly its point of mounting attachment;

Fig. 3 is a transverse sectional view through such point of attachment;

Fig. 4 is a similar view illustrating the wiper in an operative position;

Fig. 5 is a view similar to Fig. 2 but showing a modified form of the invention; and, Fig. 6 is a cross sectional view through such modification.

Referring more particularly to the drawing, the numeral 1 designates an oscillatory actuating shaft of a windshield cleaner, 2 the wiper actuating arm fixed on the shaft, 3 the arm spring for exerting the desired pressure in the wiping contact of the wiper on the windshield glass, and 4 a wiping blade which comprises a channeled holder 5 and a wiping body 6. The wiping body is illustrated as being in the form of a molded strip of rubber or like material having a wiping edge 7 along one margin and a beaded enlargement 8 along its opposite or back margin. After the channel 5 has been placed over the back edge the free marginal portions 10 of the channel are pinched toward one another to exert clamping force upon the intermediate web portion 9 of the strip.

The outer free end of the actuating arm is provided with a somewhat arcuate terminal 11 designed for introduction beneath a transverse attaching strap 12 carried by the blade. In the embodiment shown in Fig. 2 this strap is formed integrally with the channeled holder and is defined by a pair of transverse openings 13 formed in the ridge or bight portion of the channel so as to expose the resilient bead 8 as a cushion pad for the support of the hooked terminal 11. The transverse attaching strap 12 may be given the same curvature as that of the terminal 11 whereby the bead 8 will resiliently urge the two parts 11 and 12 into nesting interengagement while at the same time permit the blade to rock on the arm against the resiliency of such bead, as shown in Fig. 4.

In this connection it will be observed that the resilient urge will increase as the degree of rocking enlarges by reason of the fact that the bead will be crowded down between the converging faces 14 of the embracing marginal portions 10. To prevent this crowding action having a detrimental effect upon the trueness of the wiping edge 7 by forcing the immediately underlying edge portion out of the plane of the remaining portion of the wiping edge, the web 9 is provided with an opening 15 immediately beneath the strap 12 to thereby give the overlying cushion pad 8' a suspension mounting for free action independent of and without distorting the wiping edge.

In the embodiment depicted in Figs. 5 and 6, the strap 12' is in the form of a detachable clip having resilient sides 16 adapted to be sprung apart as they are forced on to the channel and engaged beneath the lateral shoulders 17 for resilient engagement therebeneath. The ridge portion of the channeled holder 5' is formed with an opening 18 immediately beneath the attaching clip and through this opening is projected a cushion pad 19 which may be integrally formed or molded with the wiping body 6' so that when the channel is placed over the wiping body the resilient pad will be projected through the opening 18 in nested relation with the overlying clip portion and for exposure to the hooked terminal 11 of the wiper arm, such resilient pad serving in the same capacity as the suspended cushion pad 8', namely, to hold the hooked terminal in nesting engagement with the attaching strap while permitting rocking thereof. The web may be cut out immediately beneath the pad as indicated by the dotted lines 15' to give suspension support to the pad 19.

The improved blade is economically manufactured, the embodiment of Figs. 1 through 4 being composed of two simple parts while that of Figs. 5 and 6 has the clip detachable. The resiliency of the wiping body is utilized in a dual capacity, first for efficient wiping and second for normally holding the blade upright, and this is accomplished without distorting or rendering the wiping edge untrue.

The foregoing description has been given to set forth the inventive principles involved which latter may be incorporated in other physical embodiments without departing from the spirit or scope of the invention claimed.

What is claimed is:

1. A wiper blade comprising a resilient wiping body of strip-like form having a wiping edge along one longitudinal margin, a channeled holder embracing the opposite margin and exposing a portion of the latter through an opening in its ridge or bight portion to provide a cushion pad for an actuating arm, and means rigid with the holder and overlying the pad to receive slidably the free end of the arm therebeneath for holding such associated arm in engagement with the pad, the slidable movement being longitudinal of the blade and the pad presenting a yielding friction face tending to hold the blade from sliding off such arm.

2. A wiper blade comprising a resilient wiping body of strip-like form having a wiping edge along one longitudinal margin, a channeled holder embracing the opposite margin and exposing a portion of the latter through an opening in its ridge or bight portion to provide a cushion pad support for an actuating arm, and means for holding such associated arm on the pad, the resilient body being formed with an opening beneath the cushion pad to provide suspension support for the same.

3. A wiper blade comprising a resilient wiping body of strip-like form having a wiping edge along one longitudinal margin, a channeled holder embracing the opposite margin and exposing a portion of the latter through an opening in its ridge or bight portion to provide a cushion pad support for an actuating arm during a wiping stroke of the blade, and means for holding such associated arm on the pad for support thereby, the cushion pad providing lateral support for the arm and acting to yieldingly resist rocking of the blade on the arm.

4. A wiper blade comprising a resilient wiping body of strip-like form having a wiping edge along one longitudinal margin, a channeled holder embracing the opposite margin and exposing a portion of the latter through an opening in its ridge or bight portion to provide a cushion pad support for an actuating arm, and means for holding such associated arm on the pad, the resilient body being formed with an opening beneath the the cushion pad to provide suspension support for the same, said opposite margin being in the form of an enlarged bead extending throughout the length of the blade.

5. A wiper blade comprising a resilient wiping body of strip-like form having a wiping edge along one longitudinal margin, a channeled holder embracing the opposite margin and exposing a portion of the latter through an opening in its ridge or bight portion to provide a cushion pad support for an actuating arm, and means for holding such associated arm on the pad, said cushion pad protruding through the opening of the holder and interlocking therewith.

6. A wiper blade comprising a resilient wiping body of strip-like form having a wiping edge along one longitudinal margin, a channeled holder embracing the opposite margin and exposing a portion of the latter through an opening in its ridge or bight portion to provide a cushion pad support for an actuating arm, and means for holding such associated arm on the pad, said cushion pad protruding through the opening of the holder and interlocking therewith, and said means being in the form of a separate clip removable to expose the protruding pad.

7. A wiper blade comprising a resilient wiping body of strip-like form having a wiping edge along one longitudinal margin, a channeled holder embracing the opposite margin and exposing a portion of the latter through an opening in its ridge or bight portion to provide a cushion pad support for an actuating arm, and means for holding such associated arm on the pad, the resilient body being formed with an opening beneath the cushion pad to provide suspension support for the same, said cushion pad protruding through the opening of the holder and interlocking therewith.

8. A wiper blade comprising a resilient wiping body of strip-like form having a wiping edge along one longitudinal margin, a channeled holder embracing the opposite margin and exposing a portion of the latter through an opening in its ridge or bight portion to provide a cushion pad support for an actuating arm, and means for holding such associated arm on the pad in the form of a transverse strap curved about a transverse axis.

9. A windshield cleaner comprising a wiper blade and an actuating arm therefor, the outer terminal portion of the arm being urged under spring pressure toward the windshield and having a transversely extending bearing surface, the wiper blade comprising a resilient wiping body of strip-like form having a wiping edge along one longitudinal margin and a channeled holder embracing the opposite longitudinal margin and provided with a terminal receiving opening exposing a portion of the opposite margin of said resilient wiping body, said exposed portion of the resilient wiping body constituting a cushion pad extending laterally beneath the arm terminal in contact therewith to provide lateral support for the blade on the arm, and a part rigid with the holder and extending over the opening therein to slidably receive the arm terminal therebeneath, the slidable movement being substantially parallel to the longitudinal axis of the blade and the pad presenting a yieldable friction face tending to hold the part against sliding off the arm terminal.

RAYMON E. ROUSSEAU.
H. WALTER CLUM.